(12) United States Patent
Abe et al.

(10) Patent No.: US 12,474,010 B2
(45) Date of Patent: Nov. 18, 2025

(54) OIL-WELL METAL PIPE

(71) Applicants: NIPPON STEEL CORPORATION, Tokyo (JP); VALLOUREC OIL AND GAS FRANCE, Aulnoye-Aymeries (FR)

(72) Inventors: Tomoka Abe, Tokyo (JP); Koji Akioka, Tokyo (JP); Tomoya Matsuyama, Tokyo (JP); Takao Kuranishi, Tokyo (JP)

(73) Assignees: NIPPON STEEL CORPORATION, Tokyo (JP); VALLOUREC OIL AND GAS FRANCE, Aulnoye-Aymeries (FR)

( * ) Notice: Subject to any disclaimer, the term of this patent is extended or adjusted under 35 U.S.C. 154(b) by 0 days.

(21) Appl. No.: 18/730,044

(22) PCT Filed: Jan. 31, 2023

(86) PCT No.: PCT/JP2023/003051
§ 371 (c)(1),
(2) Date: Dec. 18, 2024

(87) PCT Pub. No.: WO2023/153274
PCT Pub. Date: Aug. 17, 2023

(65) Prior Publication Data
US 2025/0116357 A1    Apr. 10, 2025

(30) Foreign Application Priority Data
Feb. 10, 2022  (JP) .................................. 2022-019788

(51) Int. Cl.
*F16L 58/04* (2006.01)
*F16L 15/08* (2006.01)
*E21B 17/042* (2006.01)

(52) U.S. Cl.
CPC ............... *F16L 58/04* (2013.01); *F16L 15/08* (2013.01); *E21B 17/042* (2013.01)

(58) Field of Classification Search
CPC . F16L 15/08; F16L 58/04; F16L 58/14; F16L 58/1045; F16L 58/02; F16L 58/08; F16L 58/10; F16L 58/1027; E21B 17/042
See application file for complete search history.

(56) References Cited

U.S. PATENT DOCUMENTS

2010/0059986 A1   3/2010  Kimoto et al.
2015/0192229 A1*  7/2015  Goto .................... C10M 177/00
                                                 285/94

(Continued)

FOREIGN PATENT DOCUMENTS

WO    2006104251 A1   10/2006
WO    2008108263 A1    9/2008
WO    2016170031 A1   10/2016

*Primary Examiner* — David Bochna
(74) *Attorney, Agent, or Firm* — Greer Burns & Crain Ltd.

(57) ABSTRACT

Provided is an oil-well metal pipe which has excellent galling resistance even when a plating layer is formed on or above a contact surface of only one of a pin and a box. An oil-well metal pipe (1) according to the present disclosure includes: a pin (40) including a pin contact surface (400) with an external thread part (41); and a box (50) including a box contact surface (500) with an internal thread part (51). The oil-well metal pipe (1) according to the present disclosure further includes: a zirconium oxide coating (100) formed on one of the pin contact surface (400) and the box contact surface (500); a first resin coating (310) formed on or above the zirconium oxide coating (100); a plating layer (200) formed on or above the other of the pin contact surface (400) and the box contact surface (500); and a second resin coating (320) formed on or above the plating layer (200).

4 Claims, 6 Drawing Sheets

(56) References Cited

U.S. PATENT DOCUMENTS

2015/0272707 A1* 10/2015 Gieselmann ........ C23C 14/0641
                                                    204/192.15
2020/0271251 A1*  8/2020 Gunji .................. F16L 19/0243

* cited by examiner

OIL-WELL METAL PIPE

TECHNICAL FIELD

The present disclosure relates to a metal pipe, and more particularly to an oil-well metal pipe.

BACKGROUND ART

Oil-well metal pipes are used in oil wells and gas wells (hereinafter, oil wells and gas wells are collectively referred to simply as "oil wells"). An oil-well metal pipe has a threaded connection. Specifically, at an oil-well drilling site, a plurality of oil-well metal pipes are connected to form an oil country tubular goods connected body, which is typified by a casing pipe and a tubing pipe, depending on the depth of the oil well. The oil country tubular goods connected body is formed by fastening oil-well metal pipes to each other. Moreover, the oil country tubular goods connected body may be subjected to inspection. When inspection is performed, the oil country tubular goods connected body is lifted up and loosened. Then, the oil-well metal pipes are detached from the oil country tubular goods connected body by loosening and are inspected. After the inspection, the oil-well metal pipes are refastened to each other again so that the oil-well metal pipes are reused as a part of the oil country tubular goods connected body.

An oil-well metal pipe includes a pin and a box. The pin has a pin contact surface, which includes an external thread part, on an outer peripheral surface of an end portion of the oil-well metal pipe. The box has a box contact surface, which includes an internal thread part, on an inner peripheral surface of an end portion of the oil-well metal pipe. In the present description, the external thread part and the internal thread part are also collectively referred to as "thread parts". Note that the pin contact surface may further include a pin unthread metal contact portion, which includes a pin sealing surface and a pin shoulder surface. Likewise, the box contact surface may further include a box unthread metal contact portion, which includes a box sealing surface and a box shoulder surface.

The pin contact surface and the box contact surface of the oil-well metal pipe repeatedly experience strong friction during fastening and loosening. For that reason, in the pin contact surface and the box contact surface, galling (unrepairable galling) is liable to occur when the fastening and loosening are repeated. Therefore, the oil-well metal pipe is required to have sufficient durability against friction, that is, to have excellent galling resistance.

Conventionally, compound greases containing heavy metal powder called as dopes have been used to improve the galling resistance of an oil-well metal pipe. Applying a compound grease to the pin contact surface and/or the box contact surface makes it possible to improve the galling resistance of the oil-well metal pipe. However, heavy metal powder of Pb, Zn, and Cu, etc. contained in the compound greases may affect the environments. For that reason, development of an oil-well metal pipe that is excellent in galling resistance even without the use of a compound grease is desired.

Techniques for improving the galling resistance of oil-well metal pipes are proposed, for example, in International Application Publication No. 2006/104251 (Patent Literature 1), International Application Publication No. 2008/108263 (Patent Literature 2), and International Application Publication No. 2016/170031 (Patent Literature 3).

The oil-well metal pipe disclosed in Patent Literature 1, which has a threaded connection, has a lubricant coating of viscous liquid or semi solid on the contact surface of at least one of a pin and a box, and a dry solid coating formed thereon. Patent Literature 1 discloses that according to this oil-well metal pipe, it is possible to suppress occurrence of rust and improve galling resistance and gastightness even without using a compound grease.

The oil-well metal pipe disclosed in Patent Literature 2, which has a threaded connection, has a plating layer of Cu alloy selected from the group consisting of Cu—Zn alloy and Cu—Zn-M1 alloy (M1 is one or more elements selected from the group consisting of Sn, Bi, and In) on the contact surface of at least one of a pin and a box. Patent Literature 2 discloses that according to this oil-well metal pipe, it is possible to suppress occurrence of crevice corrosion and improve gastightness and galling resistance even without using a compound grease.

The oil-well metal pipe disclosed in Patent Literature 3, which has a threaded connection, has a Zn—Ni alloy plating layer on the contact surface of at least one of a pin and a box. Patent Literature 3 discloses that according to this oil-well metal pipe, it is possible to improve corrosion resistance and galling resistance even without using a compound grease.

CITATION LIST

Patent Literature

Patent Literature 1: International Application Publication No. 2006/104251
Patent Literature 2: International Application Publication No. 2008/108263
Patent Literature 3: International Application Publication No. 2016/170031

SUMMARY OF INVENTION

Technical Problem

According to the technique disclosed in Patent Literature 1, it is possible to improve the galling resistance of an oil-well metal pipe by forming a lubricant coating on or above the contact surface of at least one of the pin and the box. According to the techniques disclosed in Patent Literature 2 and 3, it is possible to improve the galling resistance of an oil-well metal pipe by forming a plating layer on the contact surface of at least one of the pin and the box.

Meanwhile, in an oil-well metal pipe, from the viewpoint of productivity and production cost, there is a case in which a plating layer is formed on or above the contact surface of only one of the pin and the box. For example, in an oil-well metal pipe of T&C (Threaded and Coupled) type, which is a form of the oil-well metal pipe to be described below, the pin is formed in a pipe of longer-length, and a box is formed in a pipe of shorter-length (coupling). Here, compared with a pipe of longer-length, the coupling is easier in forming a plating layer on the surface without requiring a special apparatus, etc. For that reason, in some cases, a plating layer is formed only on or above the box contact surface, and no plating layer is formed on or above the pin contact surface.

Thus, in consideration of industrial productivity, there has been a need for an oil-well metal pipe which has excellent galling resistance even when a plating layer is formed on or above the contact surface of only one of the pin and the box. However, in the above-described Patent Literatures 2 and 3, when a plating layer is formed on or above the contact surface of only one of the pin and the box, no study has been conducted on the relationship between the configuration of the contact surface on which no plating layer is formed and the galling resistance of the oil-well metal pipe.

It is an object of the present disclosure to provide an oil-well metal pipe which has excellent galling resistance even when a plating layer is formed on or above the contact surface of only one of the pin and the box.

Solution to Problem

An oil-well metal pipe according to the present disclosure includes:
- a pipe main body including a first end portion and a second end portion,
- the pipe main body including:
- a pin formed at the first end portion, and
- a box formed at the second end portion;
wherein:
- the pin includes a pin contact surface including an external thread part; and
- the box includes a box contact surface including an internal thread part;
- the oil-well metal pipe further including:
- a zirconium oxide coating formed on one of the pin contact surface and the box contact surface,
- a first resin coating formed on or above the zirconium oxide coating,
- a plating layer formed on or above the other of the pin contact surface and the box contact surface, and
- a second resin coating formed on or above the plating layer.

Advantageous Effects of Invention

The oil-well metal pipe according to the present disclosure has excellent galling resistance even when a plating layer is formed on or above the contact surface of only one of the pin and the box.

DESCRIPTION OF EMBODIMENTS

Hereinafter, referring to the drawings, the present embodiment will be described in detail. The like or corresponding parts are given like symbols throughout the drawings, and the description thereof will not be repeated.

The present inventors have made detailed study on the means for improving galling resistance of an oil-well metal pipe in which a plating layer is formed on or above the contact surface of only one of the pin and the box. As a result, the following findings have been obtained.

First the present inventors have conducted a study on forming a resin coating above the contact surfaces of both the pin and the box, regarding an oil-well metal pipe in which a layer is formed on or above the contact surface of only one of the pin and the box. If a resin coating is formed, the resin coating enters between the contact surfaces when oil-well metal pipes are fastened to each other. As a result, it is possible to suppress occurrence of galling on the contact surfaces. If a resin coating is formed above the both contact surfaces of the pin and the box, it is possible to improve the corrosion resistance of the contact surfaces of the pin and the box to some extent.

Here, in the oil-well metal pipe according to the present embodiment, a plating layer is formed on or above the contact surface of only one of the pin and the box. That is, the oil-well metal pipe according to the present embodiment includes contact surfaces on or above which no plating layer is formed. So far, when a resin coating is formed above the contact surface on which no plating layer is formed, there is a case in which a chemical conversion treatment layer is formed below the resin coating (between the resin coating and the contact surface). The chemical conversion treatment layer enhances the corrosion resistance of the contact surface. Further, among the chemical conversion treatment layers, zinc phosphate coating enhances adhesiveness of resin coating.

Specifically, a zinc phosphate coating is likely to have coarse crystal grains, and the surface roughness thereof is likely to increase. For that reason, if a resin coating is formed on the zinc phosphate coating, the adhesiveness of resin coating is enhanced due to the so-called anchor effect. As described above, when oil-well metal pipes are fastened to each other, the contact surface is subjected to high surface pressure. For that reason, when fastening and loosening are repeatedly performed, there is possibility that the resin coating peels. However, by enhancing the adhesiveness of the resin coating, it may be possible to suppress peeling off of the resin coating even if fastening and loosening are repeated. As a result, it is expected that the galling resistance of the oil-well metal pipe is enhanced. Thus, the zinc phosphate coating has been used so far, as the chemical conversion treatment layer in oil-well metal pipes, to enhance the corrosion resistance of the contact surface, and to enhance the adhesiveness of the resin coating.

However, as a result of a detailed study by the present inventors, it has been made clear that the galling resistance of the oil-well metal pipe may be more enhanced in some cases when a zirconium oxide coating is formed as the chemical conversion treatment layer on the contact surface on which no plating layer is to be formed than when a zinc phosphate coating is formed. This point will be described in detail by using the drawings.

Figure 1:
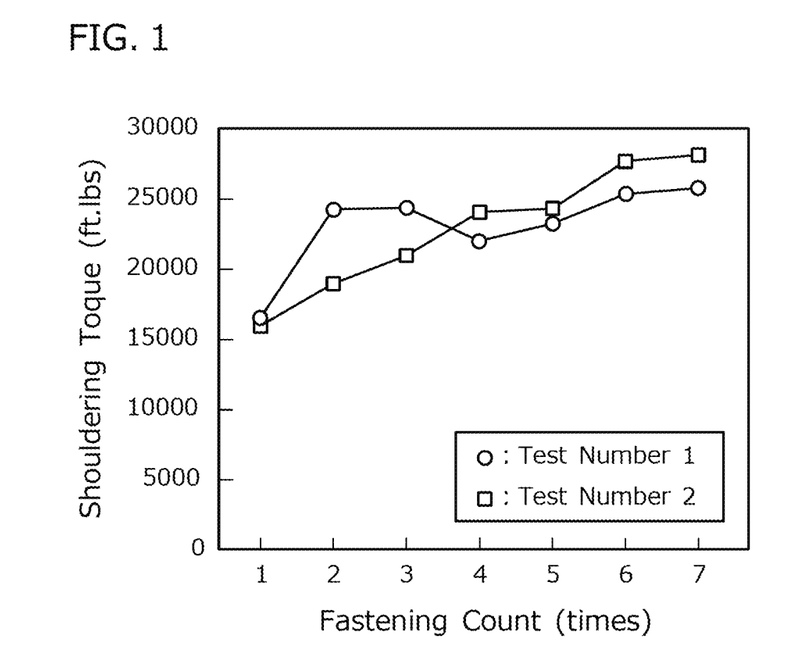
FIG. 1 is a graph illustrating the relation between the fastening count (times), and shouldering torque (ft·lbs) which is an index of galling resistance, in an example to be described later.

FIG. 1 is a diagram to illustrate relation between the fastening count (times) in an example to be described below and the shouldering torque (ft·lbs) which is an index of the galling resistance. FIG. 1 was obtained by repeating fastening and loosening on an oil-well metal pipe having a pin contact surface on which a chemical conversion treatment layer and a resin coating were formed, and a box contact surface on which a plating layer and a resin coating were formed, in an example to be described below. A circular symbol (O) in FIG. 1 shows a result of Test Number 1 in which a zirconium oxide coating is formed as the chemical conversion treatment layer. A square symbol (L) in FIG. 1 shows a result of Test Number 2 in which a zinc phosphate coating is formed as the chemical conversion treatment layer. Moreover, oil-well metal pipes having the same configuration excepting the chemical conversion treatment layer are used in Test Numbers 1 and 2.

The abscissa of FIG. 1 represents the count (times) at which the oil-well metal pipe is fastened and loosened. The ordinate of FIG. 1 represents the shouldering torque (ft·lbs) when the oil-well metal pipe is fastened. Note that the shouldering torque means a torque which is generated when the pin shoulder surface in the pin contact surface and a box shoulder surface in the box contact surface come into contact when the oil-well metal pipe used in an example to be described later is fastened. That is, as a result of repeating the fastening and loosening many times, it is judged that the galling resistance is more excellent as the shouldering torque is kept lower.

Referring to FIG. 1, at the time of the second fastening, the shouldering torque became higher in Test Number 1 in which a zirconium oxide coating was formed on the contact surface than in Test Number 2 in which a zinc phosphate coating was formed on the contact surface. Further, referring to FIG. 1, after the time of the fourth fastening, the shouldering torque was kept lower in Test Number 1 than in Test Number 2. That is, it is seen from FIG. 1 that as a result of performing fastening and loosening once, the shouldering torque becomes higher in Test Number 1 than in Test Number 2. However, in Test Number 1, the shouldering torque is maintained within a certain range even if the fastening and loosening are repeated thereafter. On the other hand, in Test Number 2, the shouldering torque keeps on increasing as the count of repetition of the fastening and loosening increases. Therefore, it can be confirmed that when the count of repetition of the fastening and loosening increases to 4 or more times, the shouldering torque becomes lower in Test Number 1 than in Test Number 2. In this way, it has been revealed that when the fastening and loosening are repeated many times, the galling resistance of the oil-well metal pipe is more enhanced when a zirconium oxide coating is formed on the contact surface than when a zinc phosphate coating is formed on the contact surface. The details of this reason have not been clarified. However, the present inventors infer as follows.

As described above, the zinc phosphate coating is likely to have coarse crystal grains, and the surface roughness thereof is likely to increase. On the other hand, in the case of the zirconium oxide coating, a dense, uniform, and thin coating is likely to be formed. That is, in the viewpoint of the adhesiveness of the resin coating to be formed on the chemical conversion treatment layer, it is considered that the resin coating on the zinc phosphate coating has higher adhesiveness than the resin coating on the zirconium oxide coating. In short, the resin coating on the zirconium oxide coating is more likely to peel than the resin coating on the zinc phosphate coating. As a result, there is possibility that at the time of the second fastening, the shouldering torque became lower in Test Number 2 in which a zinc phosphate coating on which more resin coating remained was formed.

Thereafter, when the fastening and loosening are further repeated, a larger part of the resin coating on the zirconium oxide coating may possibly peel. On the other hand, since the resin coating on the zinc phosphate coating is likely to remain, it may possibly damage the resin coating on the plating layer at the time of fastening and loosening. It is speculated that as a result, the total amount of the resin coating on the plating layer and the resin coating on the zinc phosphate coating may become lower than in the case of forming the zirconium oxide coating. In short, the present inventors infer that the resin coating on the zirconium oxide coating is unlikely to damage the resin coating on the plating layer for its high peelability even if the fastening and loosening are repeated. Thus, the present inventors infer that the shouldering torque can be kept lower in Test Number 1 in which the resin coating on the plating layer is likely to remain even when the fastening and loosening are repeated many times.

Note that there is also possibility that, due to a mechanism other than that described above, the galling resistance of the oil-well metal pipe is enhanced by forming a zirconium oxide coating on the contact surface on which no plating layer is formed, even when the fastening and loosening are repeated. However, it is proved by the examples described below that the galling resistance of an oil-well metal pipe is enhanced by forming a zirconium oxide coating on the contact surface of one of the pin and the box, forming a resin coating on or above the zirconium oxide coating, forming a plating layer on or above the contact surface of the other of the pin and the box, and forming a resin coating on or above the plating layer.

The gist of the oil-well metal pipe of the present embodiment that has been completed based on the findings described so far is as follows.

[1]

An oil-well metal pipe including:
  a pipe main body including a first end portion and a second end portion,
  the pipe main body including:
  a pin formed at the first end portion; and
  a box formed at the second end portion,
  wherein:
  the pin includes a pin contact surface including an external thread part; and
  the box includes a box contact surface including an internal thread part;
  the oil-well metal pipe further including:
  a zirconium oxide coating formed on one of the pin contact surface and the box contact surface,
  a first resin coating formed on or above the zirconium oxide coating,
  a plating layer formed on or above the other of the pin contact surface and the box contact surface, and
  a second resin coating formed on or above the plating layer.

[2]
The oil-well metal pipe according to [1], wherein
the zirconium oxide coating is formed on the pin contact surface, and
the plating layer is formed on or above the box contact surface.

[3]
The oil-well metal pipe according to [1] or [2], wherein the plating layer is a Zn—Ni alloy plating layer.

Hereinafter, the oil-well metal pipe according to the present embodiment will be described in detail.

[Structure of Oil-Well Metal Pipe]

First, the structure of an oil-well metal pipe of the present embodiment will be described. The oil-well metal pipe has a well-known structure. The available types of oil-well metal pipe are a T&C type oil-well metal pipe and an integral type oil-well metal pipe. Hereinafter, each type of oil-well metal pipe will be described in detail.

[When Oil-Well Metal Pipe 1 is T&C Type]

Figure 2:
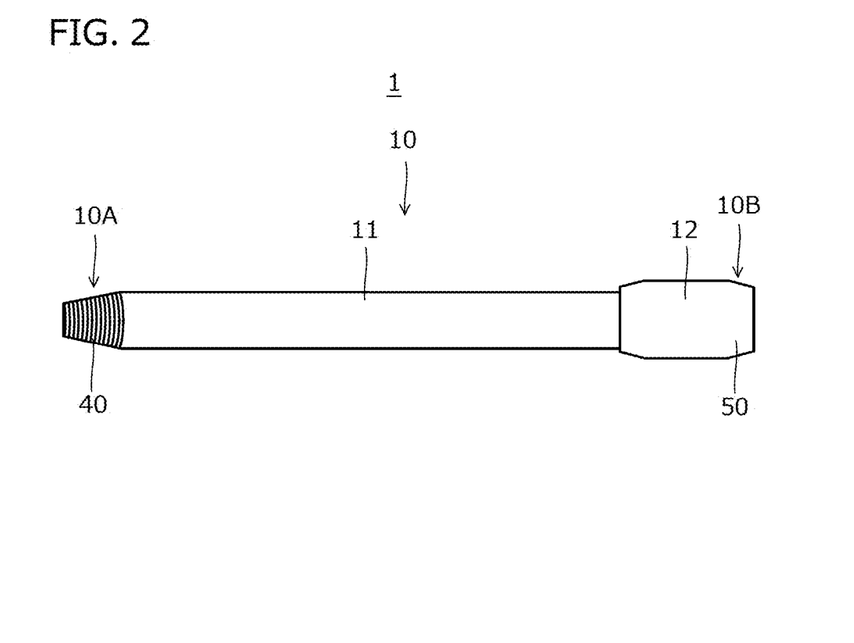
FIG. 2 is a side view of an oil-well metal pipe according to the present embodiment.

FIG. 2 is a side view of an oil-well metal pipe 1 according to the present embodiment. FIG. 2 is a side view of an oil-well metal pipe 1 of a so-called T&C (Threaded and Coupled) type. Referring to FIG. 2, the oil-well metal pipe 1 includes a pipe main body 10.

The pipe main body 10 extends in the pipe axis direction. A cross section perpendicular to the pipe axis direction of the pipe main body 10 is of a circular shape. The pipe main body 10 includes a first end portion 10A and a second end portion 10B. The first end portion 10A is an end portion on the opposite side to the second end portion 10B. In the T&C type oil-well metal pipe 1 shown in FIG. 2, the pipe main body 10 includes a pin tube body 11 and a coupling 12. The coupling 12 is attached to one end of the pin tube body 11. More specifically, the coupling 12 is fastened by threading to the one end of the pin tube body 11.

Figure 3:
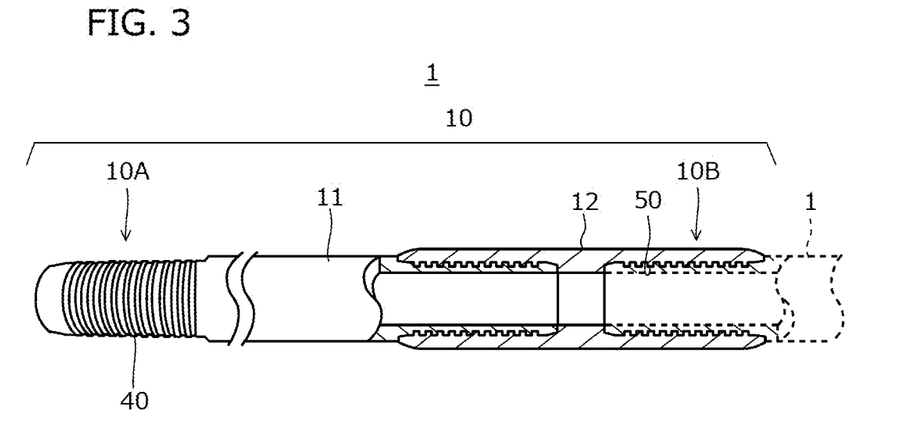
FIG. 3 is a partial cross-sectional view to illustrate a cross section (longitudinal cross section) parallel to the pipe axial direction, of a coupling of the oil-well metal pipe illustrated in FIG. 2.

FIG. 3 is a partial cross-sectional view to illustrate a cross section (longitudinal cross section) parallel to the pipe axis direction of the coupling 12 of the oil-well metal pipe 1 illustrated in FIG. 2. Referring to FIGS. 2 and 3, the pipe main body 10 includes a pin 40 and a box 50. The pin 40 is formed at the first end portion 10A of the pipe main body 10. At the time of fastening, the pin 40 is inserted into the box 50 of another oil-well metal pipe 1 (not shown) to be fastened by threading to the box 50 of the other oil-well metal pipe 1.

The box 50 is formed at the second end portion 10B of the pipe main body 10. At the time of fastening, a pin 40 of another oil-well metal pipe 1 is inserted into the box 50, and thus the box 50 is fastened by threading to the pin 40 of the other oil-well metal pipe 1.

[Structure of Pin 40]

Figure 4:
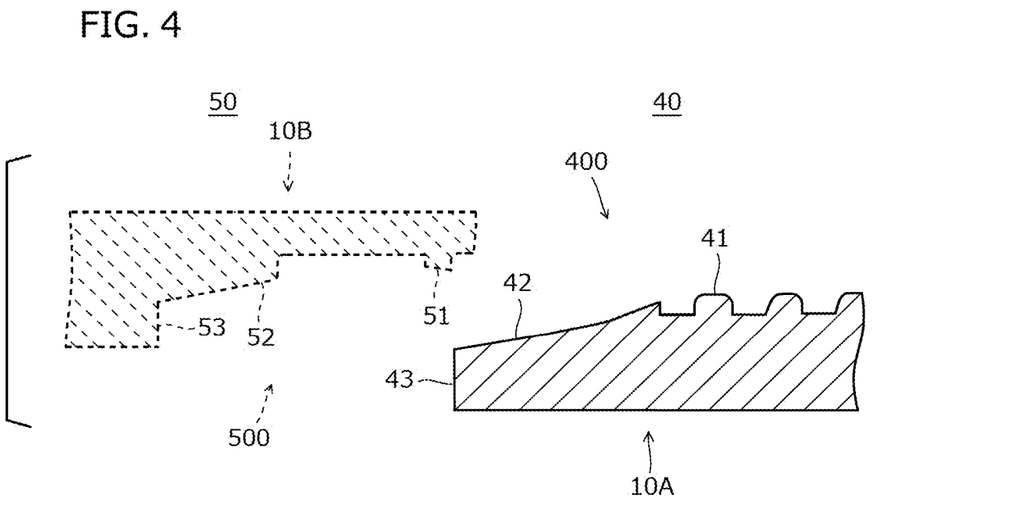
FIG. 4 is a cross-sectional view, which is parallel to the pipe axis direction of the oil-well metal pipe, of a portion in the vicinity of a pin of the oil-well metal pipe illustrated in FIG. 3.

FIG. 4 is a cross-sectional view, which is parallel to a pipe axis direction of the oil-well metal pipe 1, of a portion in the vicinity of a pin 40 of the oil-well metal pipe 1 illustrated in FIG. 3. A dashed line portion in FIG. 4 represents the structure of the box 50 of another oil-well metal pipe 1 in the case of fastening to the other oil-well metal pipe 1. Referring to FIG. 4, the pin 40 includes a pin contact surface 400 on an outer peripheral surface of the first end portion 10A of the pipe main body 10. At the time of fastening to another oil-well metal pipe 1, the pin contact surface 400 is screwed into the box 50 of the other oil-well metal pipe 1 to come into contact with the box contact surface 500 (to be described later) of the box 50.

The pin contact surface 400 at least includes an external thread part 41 formed on the outer peripheral surface of the first end portion 10A. The pin contact surface 400 may further include a pin sealing surface 42 and a pin shoulder surface 43. In FIG. 4, the pin shoulder surface 43 is disposed at the front end face of the first end portion 10A, and the pin sealing surface 42 is disposed on the front end side of the first end portion 10A with respect to the external thread part 41 in the outer peripheral surface of the first end portion 10A. That is, the pin sealing surface 42 is disposed between the external thread part 41 and the pin shoulder surface 43. The pin sealing surface 42 is provided in a tapered shape. Specifically, in the pin sealing surface 42, the external diameter thereof gradually decreases from the external thread part 41 toward the pin shoulder surface 43 in the longitudinal direction (pipe axis direction) of the first end portion 10A.

At the time of fastening to another oil-well metal pipe 1, the pin sealing surface 42 comes into contact with the box sealing surface 52 (to be described later) of the box 50 of the other oil-well metal pipe 1. More specifically, at the time of fastening, as a result of the pin 40 being inserted into the box 50 of another oil-well metal pipe 1, the pin sealing surface 42 comes into contact with the box sealing surface 52. Then, as a result of the pin 40 being further screwed into the box 50 of another oil-well metal pipe 1, the pin sealing surface 42 comes into close contact with the box sealing surface 52. As a result, at the time of fastening, the pin sealing surface 42 comes into close contact with the box sealing surface 52, thus forming a seal based on metal-metal contact. For that reason, it is possible to improve gastightness in mutually fastened oil-well metal pipes 1.

In FIG. 4, the pin shoulder surface 43 is disposed at a front end face of the first end portion 10A. That is, in the pin 40 illustrated in FIG. 4, an external thread part 41, a pin sealing surface 42, and a pin shoulder surface 43 are disposed in that order from the center of the pipe main body 10 toward the first end portion 10A. At the time of fastening to another oil-well metal pipe 1, the pin shoulder surface 43 opposes and contacts the box shoulder surface 53 (to be described later) of the box 50 of another oil-well metal pipe 1. More specifically, at the time of fastening, as a result of the pin 40 being inserted into the box 50 of another oil-well metal pipe 1, the pin shoulder surface 43 comes into contact with the box shoulder surface 53. As a result of this, at the time of fastening, it is possible to achieve a high torque. Moreover, it is possible to stabilize the positional relation between the pin 40 and the box 50 in a fastened state.

Note that the pin contact surface 400 of the pin 40 includes at least the external thread part 41. That is, the pin contact surface 400 includes the external thread part 41, and needs not include the pin sealing surface 42 and the pin shoulder surface 43. The pin contact surface 400 includes the external thread part 41 and the pin shoulder surface 43, and needs not include the pin sealing surface 42. The pin contact surface 400 includes the external thread part 41 and the pin sealing surface 42, and needs not include the pin shoulder surface 43.

[Structure of Box 50]

Figure 5:
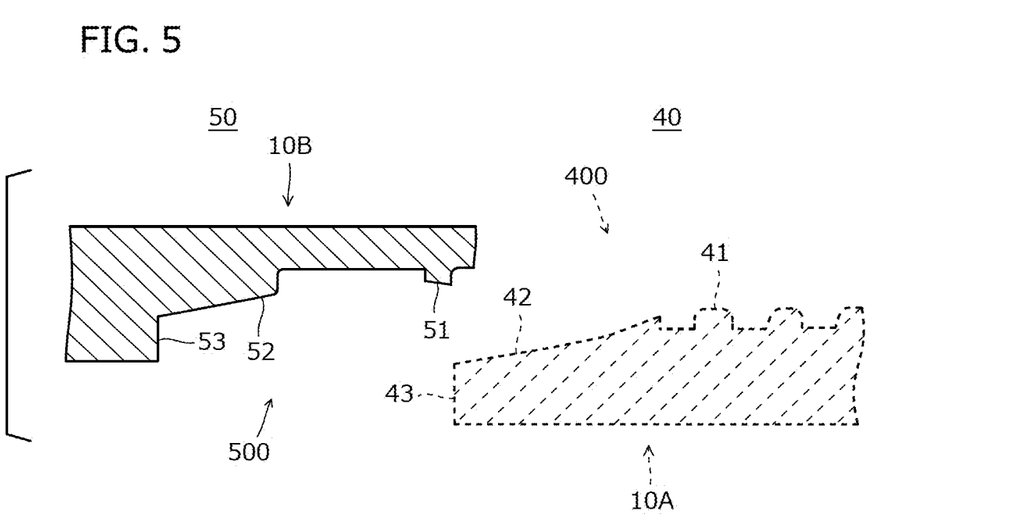
FIG. 5 is a cross-sectional view, which is parallel to the pipe axis direction of the oil-well metal pipe, of a portion in the vicinity of a box of the oil-well metal pipe illustrated in FIG. 3.

FIG. 5 is a cross-sectional view, which is parallel to the pipe axis direction of the oil-well metal pipe 1, of a portion in the vicinity of a box 50 of the oil-well metal pipe 1 illustrated in FIG. 3. A dashed line portion in FIG. 5 represents the structure of the pin 40 of another oil-well metal pipe 1 in the case of fastening to the other oil-well metal pipe 1. Referring to FIG. 5, the box 50 includes a box contact surface 500 on an inner peripheral surface of the second end portion 10B of the pipe main body 10. At the time of fastening to another oil-well metal pipe 1, the pin 40 of the other oil-well metal pipe 1 is screwed into the box 50, and the box contact surface 500 comes into contact with the pin contact surface 400 of the pin 40.

The box contact surface 500 includes at least an internal thread part 51 formed in the inner peripheral surface of the second end portion 10B. At the time of fastening, the internal thread part 51 engages with the external thread part 41 of the pin 40 of the other oil-well metal pipe 1.

The box contact surface 500 may further include a box sealing surface 52 and a box shoulder surface 53. In FIG. 5, the box sealing surface 52 is disposed on the pipe main body 10 side with respect to the internal thread part 51, in the inner peripheral surface of the second end portion 10B. That is, the box sealing surface 52 is disposed between the internal thread part 51 and the box shoulder surface 53. The box sealing surface 52 is provided in a tapered shape. Specifically, the internal diameter of the box sealing surface 52 gradually decreases from the internal thread part 51 toward the box shoulder surface 53 in the longitudinal direction (pipe axis direction) of the second end portion 10B.

At the time of fastening to another oil-well metal pipe 1, the box sealing surface 52 comes into contact with the pin sealing surface 42 of the pin 40 of the other oil-well metal pipe 1. More specifically, at the time of fastening, as the result of the pin 40 of the other oil-well metal pipe 1 being screwed into the box 50, the box sealing surface 52 comes into contact with the pin sealing surface 42, and as a result of the pin 40 being screwed in further, the box sealing surface 52 comes into close contact with the pin sealing surface 42. As the result of this, at the time of fastening, the box sealing surface 52 comes into close contact with the pin sealing surface 42, thereby forming a seal based on metal-metal contact. Therefore, it is possible to improve the gastightness in the mutually fastened oil-well metal pipes 1.

The box shoulder surface 53 is disposed on the pipe main body 10 side with respect to the box sealing surface 52. That is, in the box 50, the box shoulder surface 53, the box sealing surface 52 and the internal thread part 51 are disposed in that order from the center of the pipe main body 10 toward the front end of the second end portion 10B. At the time of fastening to another oil-well metal pipe 1, the box shoulder surface 53 opposes and contacts the pin shoulder surface 43 of the pin 40 of the other oil-well metal pipe 1. More specifically, at the time of fastening, as a result of the pin 40 of the other oil-well metal pipe 1 being inserted into the box 50, the box shoulder surface 53 comes into contact with the pin shoulder surface 43. As the result of this, at the time of fastening, it is possible to achieve a high torque. Further, it is possible to stabilize the positional relation between the pin 40 and the box 50 in a fastened state.

The box contact surface 500 includes at least the internal thread part 51. At the time of fastening, the internal thread part 51 of the box contact surface 500 of the box 50 corresponds to the external thread part 41 of the pin contact surface 400 of the pin 40, and comes into contact with the external thread part 41. The box sealing surface 52 corresponds to the pin sealing surface 42, and comes into contact with the pin sealing surface 42. The box shoulder surface 53 corresponds to the pin shoulder surface 43, and comes into contact with the pin shoulder surface 43.

When the pin contact surface 400 includes the external thread part 41 and does not include the pin sealing surface 42 and the pin shoulder surface 43, the box contact surface 500 includes the internal thread part 51, and does not include the box sealing surface 52 and the box shoulder surface 53. When the pin contact surface 400 includes the external thread part 41 and the pin shoulder surface 43 and does not include the pin sealing surface 42, the box contact surface 500 includes the internal thread part 51 and the box shoulder surface 53, and does not include the box sealing surface 52. When the pin contact surface 400 includes the external thread part 41 and the pin sealing surface 42 and does not include the pin shoulder surface 43, the box contact surface 500 includes the internal thread part 51 and the box sealing surface 52, and does not include the box shoulder surface 53.

The pin contact surface 400 may include a plurality of the external thread parts 41, may include a plurality of the pin sealing surfaces 42, and may include a plurality of the pin shoulder surfaces 43. For example, on the pin contact surface 400 of the pin 40, the pin shoulder surface 43, the pin sealing surface 42, the external thread part 41, the pin sealing surface 42, the pin shoulder surface 43, the pin sealing surface 42 and the external thread part 41 may be disposed in that order from the front end of the first end portion 10A toward the center of the pipe main body 10. In this case, on the box contact surface 500 of the box 50, the internal thread part 51, the box sealing surface 52, the box shoulder surface 53, the box sealing surface 52, the internal thread part 51, the box sealing surface 52 and the box shoulder surface 53 are disposed in that order from the front end of the second end portion 10B toward the center of the pipe main body 10.

Figure 6:
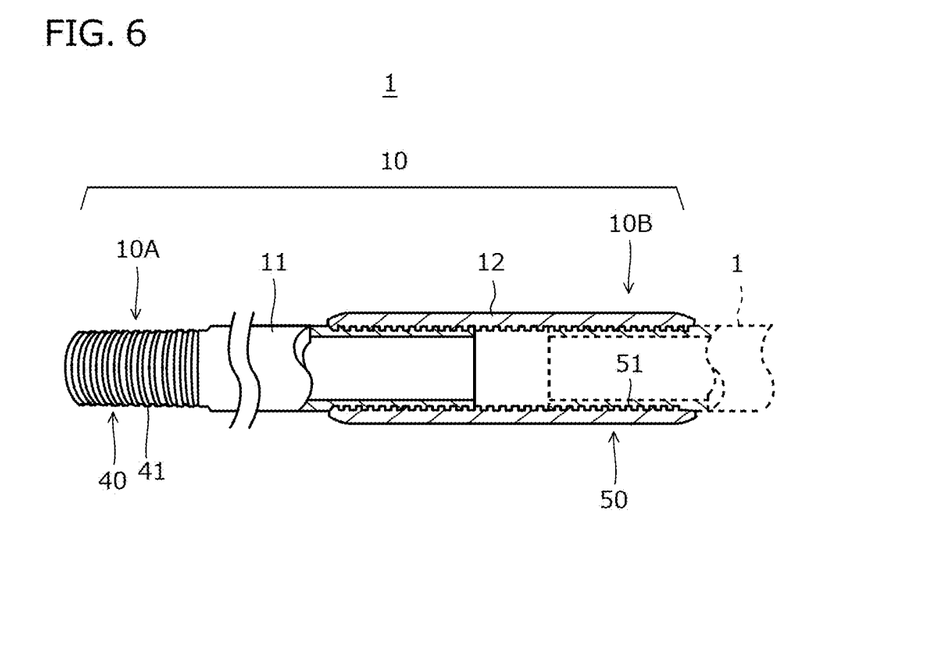
FIG. 6 is a partial cross-sectional view including a longitudinal cross section of the oil-well metal pipe of the present embodiment having a configuration different from that in FIG. 3.

FIGS. 4 and 5 illustrate a so-called premium joint in which a pin 40 includes an external thread part 41, a pin sealing surface 42, and a pin shoulder surface 43, and a box 50 includes an internal thread part 51, a box sealing surface 52, and a box shoulder surface 53. However, as described above, the pin 40 includes the external thread part 41 and needs not include the pin sealing surface 42 and the pin shoulder surface 43. In this case, the box 50 includes the internal thread part 51 and does not include the box sealing surface 52 and the box shoulder surface 53. FIG. 6 is a partial cross-sectional view including a longitudinal cross section of the oil-well metal pipe of the present embodiment having a configuration different from that in FIG. 3.

[When Oil-Well Metal Pipe 1 is Integral Type]

The oil-well metal pipe 1 illustrated in FIG. 2, FIG. 3 and FIG. 6 is a so-called T&C type oil-well metal pipe 1, in which the pipe main body 10 includes the pin tube body 11 and the coupling 12. However, the oil-well metal pipe 1 according to the present embodiment may be of an integral type instead of a T&C type.

Figure 7:
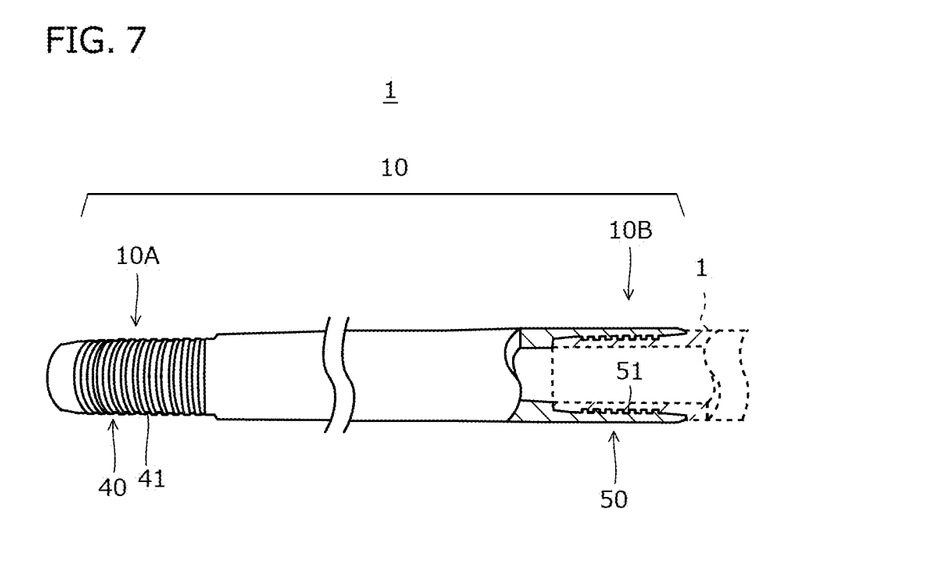
FIG. 7 is a partial cross-sectional view including a longitudinal cross section of an integral type oil-well metal pipe according to the present embodiment.

FIG. 7 is a partial cross-sectional view including a longitudinal cross section of an integral type oil-well metal pipe 1 according to the present embodiment. Referring to FIG. 7, the integral type oil-well metal pipe 1 includes a pipe main body 10. The pipe main body 10 includes a first end portion 10A and a second end portion 10B. The first end portion 10A is disposed on the opposite side to the second end portion 10B. As described above, in the T&C type oil-well metal pipe 1, the pipe main body 10 includes the pin tube body 11 and the coupling 12. That is, in the T&C type oil-well metal pipe 1, the pipe main body 10 is constituted by fastening two separate members (the pin tube body 11 and the coupling 12). In contrast, in the integral type oil-well metal pipe 1, the pipe main body 10 is formed in an integral manner.

The pin 40 is formed at the first end portion 10A of the pipe main body 10. At the time of fastening, the pin 40 is inserted in and screwed into the box 50 of another integral type oil-well metal pipe 1, and thereby fastened to the box 50 of the other integral type oil-well metal pipe 1. The box 50 is formed at the second end portion 10B of the pipe main body 10. At the time of fastening, the pin 40 of another integral type oil-well metal pipe 1 is inserted in and screwed into the box 50, and thereby fastened to the pin 40 of the other integral type oil-well metal pipe 1.

The structure of the pin 40 of the integral type oil-well metal pipe 1 is the same as the structure of the pin 40 of the T&C type oil-well metal pipe 1 illustrated in FIG. 4. Similarly, the structure of the box 50 of the integral type oil-well metal pipe 1 is the same as the structure of the box 50 of the T&C type oil-well metal pipe 1 illustrated in FIG. 5. Note that, in FIG. 4 and FIG. 5, the pin shoulder surface 43, the pin sealing surface 42 and the external thread part 41 are disposed in that order in the pin 40 from the front end of the first end portion 10A toward the center of the pipe main body 10. Therefore, the internal thread part 51, the box sealing surface 52 and the box shoulder surface 53 are disposed in that order in the box 50 from the front end of the second end portion 10B toward the center of the pipe main body 10. However, similarly to the pin contact surface 400 of the pin 40 of the T&C type oil-well metal pipe 1, it suffices that the pin contact surface 400 of the pin 40 of the integral type oil-well metal pipe 1 includes at least the external thread part 41. Further, similarly to the box contact surface 500 of the box 50 of the T&C type oil-well metal pipe 1, it suffices that the box contact surface 500 of the box 50 of the integral type oil-well metal pipe 1 includes at least the internal thread part 51.

In short, the oil-well metal pipe 1 of the present embodiment may be of a T&C type or may be of an integral type.

[Zirconium Oxide Coating]

Figure 8:
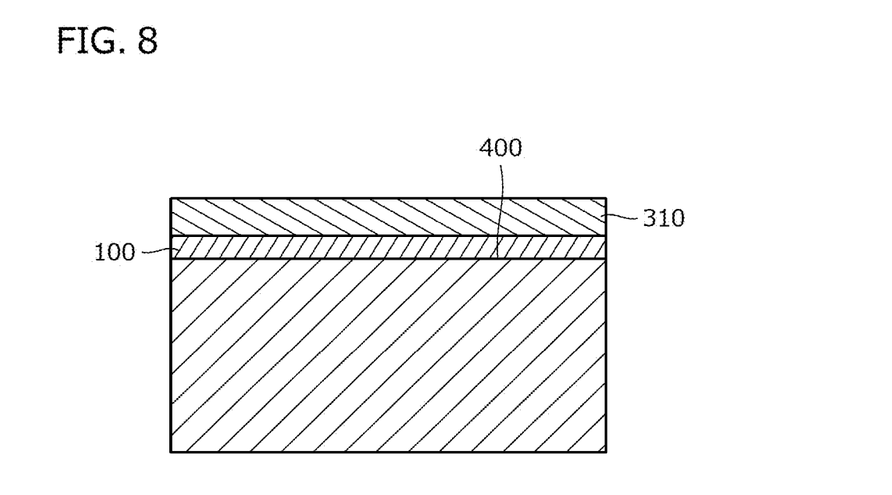
FIG. 8 is a cross-sectional view of the vicinity of the pin contact surface of an oil-well metal pipe according to the present embodiment.
Figure 9:
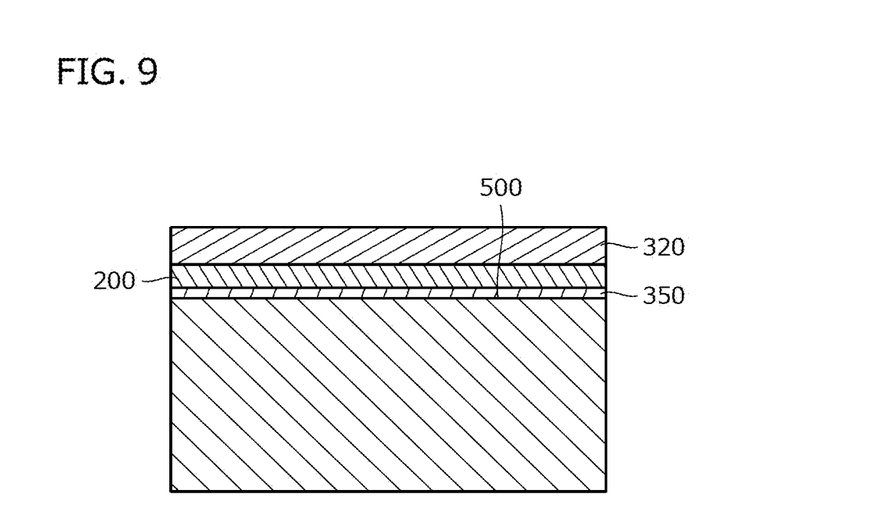
FIG. 9 is a cross-sectional view of the vicinity of a box contact surface corresponding to FIG. 8.
Figure 10:
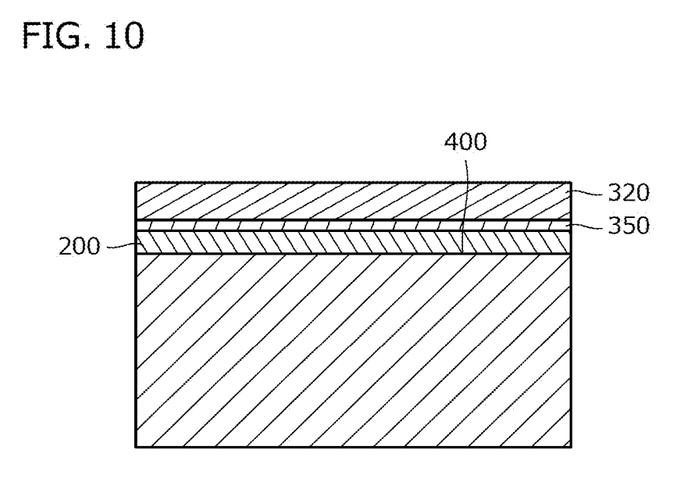
FIG. 10 is a cross-sectional view of the vicinity of another pin contact surface of a configuration different from that of FIG. 8.
Figure 11:
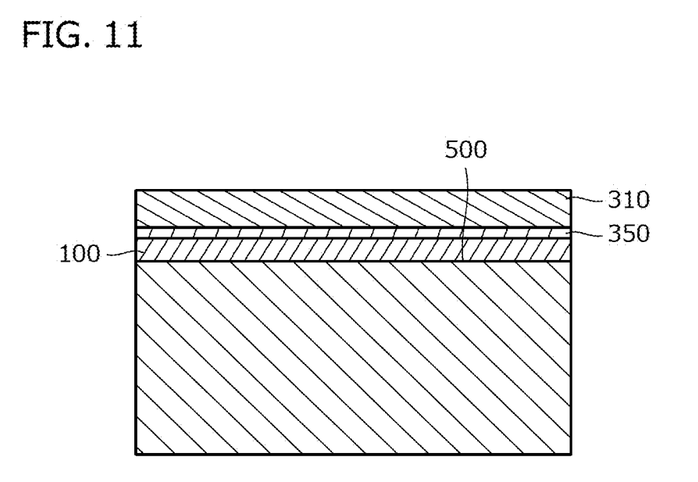
FIG. 11 is a cross-sectional view of the vicinity of the box contact surface corresponding to FIG. 10.

The oil-well metal pipe 1 according to the present embodiment includes a zirconium oxide coating 100 on one of a pin contact surface 400 and a box contact surface 500. FIG. 8 is a cross-sectional view of the vicinity of the pin contact surface 400 of an oil-well metal pipe 1 according to the present embodiment. FIG. 9 is a cross-sectional view of the vicinity of the box contact surface 500 corresponding to FIG. 8. FIG. 10 is a cross-sectional view of the vicinity of another pin contact surface 400 of a configuration different from that of FIG. 8. FIG. 11 is a cross-sectional view of the vicinity of the box contact surface 500 corresponding to FIG. 10.

Referring to FIG. 8, the zirconium oxide coating 100 may be formed on the pin contact surface 400. In this case, referring to FIG. 9, a plating layer 200 is formed on or above the corresponding box contact surface 500. Further, referring to FIG. 11, the zirconium oxide coating 100 may be formed on the box contact surface 500. In this case, referring to FIG. 10, a plating layer 200 is formed on or above the corresponding pin contact surface 400. That is, the zirconium oxide coating 100 may be formed either on the pin contact surface 400 or on the box contact surface 500. In short, the oil-well metal pipe 1 according to the present embodiment includes a zirconium oxide coating 100 which is formed on one of the pin contact surface 400 and the box contact surface 500.

The zirconium oxide coating 100 mainly contains amorphous zirconium oxide ($ZrO_2$) and/or amorphous zirconium hydroxide ($Zr(OH)_4$). That is, in the zirconium oxide coating 100 according to the present embodiment, the total content of the amorphous zirconium oxide ($ZrO_2$) hydrate and the amorphous zirconium hydroxide ($Zr(OH)_4$) is, for example, 80 mass % or more. The zirconium oxide coating 100 may further contain an organic compound. The zirconium oxide coating 100 is a dense, thin and uniform coating. For that reason, the resin coating formed on or above the zirconium oxide coating 100 has low adhesiveness and is likely to peel. Therefore, it is considered that the resin coating formed on or above the plating layer 200 tends to remain even after repeated fastening and loosening and, as a result, improves the galling resistance of the oil-well metal pipe 1. Note that the resin coating will be described later.

As described above, the zirconium oxide coating 100 is a thin coating. Therefore, it is difficult to measure the thickness of the zirconium oxide coating 100. However, the zirconium oxide coating 100 can be confirmed by the following method. First, for the zirconium oxide coating, a calibration curve is created between the Zr content obtained by the inductively coupled high-frequency plasma atomic emission spectroscopy (ICP-AES) and the Zr signal volume detected by fluorescent X-ray analysis. Specifically, the Zr signal volume is measured by fluorescent X-ray analysis for a plurality of steel sheets on each of which a zirconium oxide coating having a different thickness is formed. A plurality of steel sheets, on each of which a zirconium oxide coating having a different thickness is formed, are further immersed in a hydrofluoric acid solution or the like to dissolve the zirconium oxide coating. Elemental analysis by the ICP-AES is performed on the hydrofluoric acid solution in which the zirconium oxide coating has been dissolved. A calibration curve is created using the Zr content obtained by elemental analysis and the Zr signal volume obtained by the fluorescent X-ray analysis. The fluorescent X-ray analysis is performed on the pin contact surface 400 or the box contact surface 500 according to the present embodiment to determine the Zr signal volume. It is possible to confirm the presence of the zirconium oxide coating by quantifying the Zr content in the zirconium oxide coating from the obtained Zr signal volume using the created calibration curve.

[Plating Layer]

The oil-well metal pipe 1 according to the present embodiment includes a zirconium oxide coating 100 on one of the pin contact surface 400 and the box contact surface 500, and includes a plating layer 200 on or above the other of the pin contact surface 400 and the box contact surface 500. As described above, referring to FIGS. 8 and 9, when the zirconium oxide coating 100 is formed on the pin contact surface 400, the plating layer 200 is formed on or above the box contact surface 500. Similarly, referring to FIGS. 10 and 11, when the zirconium oxide coating 100 is formed on the box contact surface 500, the plating layer 200 is formed on or above the pin contact surface 400.

Here, the notion that the plating layer 200 is formed on or above the pin contact surface 400 or the box contact surface 500 means that: the plating layer 200 may be formed directly on the pin contact surface 400; the plating layer 200 may be formed directly on the box contact surface 500; another layer may be formed on the pin contact surface 400, and the plating layer 200 may be formed thereon; and another layer may be formed on the box contact surface 500 and the plating layer 200 may be formed thereon. Specifically, referring to FIG. 9, another layer 350 may be formed on the box contact surface 500, and the plating layer 200 may be formed on the other layer 350. Further, referring to FIG. 10, the plating layer 200 may be formed directly on the pin contact surface 400. Note that the other layer 350 will be described later.

In the present embodiment, the plating layer 200 is not particularly limited. The plating layer 200 can be appropriately selected from well-known plating layers. The plating layer 200 may be, for example, a Cu plating layer, a Cr plating layer, a Zn plating layer, a Ni plating layer, a Cu—Sn alloy plating layer, a Zn—Co alloy plating layer, a Zn—Ni alloy plating layer, a Ni—P alloy plating layer, or a Cu—Sn—Zn alloy plating layer. Preferably, the plating layer 200 is a Zn—Ni alloy plating layer. If the plating layer 200 is a Zn—Ni alloy plating layer, the galling resistance of the oil-well metal pipe 1 according to the present embodiment is further enhanced due to its excellent wear resistance.

Further, in the present embodiment, the plating layer 200 may be a multi-layered plating layer including a plurality of plating layers. Further, in the present embodiment, the thickness of the plating layer 200 is not particularly limited. The thickness of the plating layer 200 is, for example, 1 to 50 µm.

[First Resin Coating]

The oil-well metal pipe 1 according to the present embodiment includes a zirconium oxide coating 100 on one of the pin contact surface 400 and the box contact surface 500, and includes a first resin coating 310 on or above the zirconium oxide coating 100. Here, including the first resin coating 310 on or above the zirconium oxide coating 100 means that the first resin coating 310 may be formed directly on the zirconium oxide coating 100, and that another layer may be formed on the zirconium oxide coating 100 and the first resin coating 310 may be formed on the other layer. Specifically, referring to FIG. 8, the first resin coating 310 may be formed directly on the zirconium oxide coating 100. Further, referring to FIG. 11, another layer 350 may be formed on the zirconium oxide coating 100, and the first resin coating 310 may be formed on the other layer 350.

In the present embodiment, the first resin coating 310 is not particularly limited. The first resin coating 310 can be appropriately selected from well-known resin coatings. The base material of the first resin coating 310 is a resin. The type of resin is not particularly limited, and a well-known resin can be used. The resin may be, for example, a thermosetting resin or an ultraviolet curable resin. Specifically, the resin may be, for example, an acrylic resin, a silicone resin, an acrylic silicone resin, a urethane resin, an epoxy resin, a fluororesin, a phenol resin, a polyimide resin, a polyamide imide resin, a polyamide resin, or a polyether ether ketone resin. Preferably, the first resin coating 310 is one or more kinds selected from the group consisting of an acrylic resin, a urethane resin, and an epoxy resin. In this case, the resin becomes harder due to thermal curing, and the galling resistance of the oil-well metal pipe 1 according to the present embodiment is further enhanced. More preferably, the first resin coating 310 is an epoxy resin.

The first resin coating 310 according to the present embodiment may further contain a lubricant material. The lubricant material is not particularly limited as long as it is a material that enhances the lubricity of the first resin coating 310. The lubricant material may be, for example, graphite, zinc oxide, boron nitride, talc, molybdenum disulfide, or tungsten disulfide, graphite fluoride, tin sulfide, bismuth sulfide, organic molybdenum, thiosulfate, or polytetrafluoro ethylene (PTFE), melamine cyanurate (MCA), or perfluoropolyether (PFPE). Further, a plurality of types of the above-mentioned lubricant materials may be contained in combination.

The first resin coating 310 according to the present embodiment may contain other materials. For example, it may contain a pigment, an anti-rust addition agent, or an antiseptic agent. That is, in the present embodiment, the first resin coating 310 is not particularly limited and may have a well-known configuration. Further, in the present embodiment, the thickness of the first resin coating 310 is not particularly limited. The thickness of the first resin coating 310 is, for example, 1 to 100 µm.

[Second Resin Coating]

The oil-well metal pipe 1 according to the present embodiment includes a zirconium oxide coating 100 on one of the pin contact surface 400 and the box contact surface 500, and includes a plating layer 200 on or above the other of the pin contact surface 400 and the box contact surface 500, further including a second resin coating 320 on or above the plating layer 200. Here, including the second resin coating 320 on or above the plating layer 200 means that the second resin coating 320 may be formed directly on the plating layer 200, or another layer may be formed on the plating layer 200, and the second resin coating 320 may be formed on the other layer. Specifically, referring to FIG. 9, the second resin coating 320 may be formed directly on the plating layer 200. Further, referring to FIG. 10, another layer 350 may be formed on the plating layer 200, and the second resin coating 320 may be formed thereon.

In the present embodiment, the second resin coating 320 is not particularly limited. The second resin coating 320 can be appropriately selected from well-known resin coatings. The base material of the second resin coating 320 is a resin. The type of resin is not particularly limited, and a well-known resin can be used. The resin may be, for example, a phenol resin, a urethane resin, an epoxy resin, a furan resin, a polyimide resin, or a polyamide imide resin, a polyamide resin, or a polyether ether ketone resin. Preferably, the second resin coating 320 is one or more kinds selected from the group consisting of a phenol resin, a urethane resin, and an epoxy resin. In this case, the resin becomes harder due to thermal curing, and the galling resistance of the oil-well metal pipe 1 according to the present embodiment is further enhanced. More preferably, the second resin coating 320 is an epoxy resin.

The second resin coating 320 according to the present embodiment may further contain a lubricant material. The lubricant material is not particularly limited as long as it is a material that enhances the lubricity of the second resin coating 320. The lubricant material may be, for example, graphite, zinc oxide, boron nitride, talc, molybdenum disulfide, or tungsten disulfide, graphite fluoride, tin sulfide, bismuth sulfide, organic molybdenum, thiosulfate, or polytetrafluoro ethylene (PTFE), melamine cyanurate (MCA), or perfluoropolyether (PFPE). Further, a plurality of types of the above-described lubricant materials may be contained in combination.

The second resin coating 320 according to the present embodiment may contain other materials. For example, it may contain a pigment, an anti-rust addition agent, or an antiseptic agent. That is, in the present embodiment, the second resin coating 320 is not particularly limited and may have a well-known configuration. Further, in the present embodiment, the thickness of the second resin coating 320 is not particularly limited. The thickness of the second resin coating 320 is, for example, 1 to 100 µm. Note that the second resin coating 320 may have the same configuration as that of the first resin coating 310, or may have a different configuration. That is, the second resin coating 320 may contain the same resin, the same lubricant material, and the same antiseptic agent as those of the first resin coating 310. The second resin coating 320 may further contain a different resin, a different lubricant material, and a different pigment from those of the first resin coating 310.

[Other Layers]

The oil-well metal pipe 1 according to the present embodiment may include a zirconium oxide coating 100, a plating layer 200, a first resin coating 310, a second resin coating 320, and another layer 350 on or above the pin contact surface 400 and/or box contact surface 500. Referring to FIG. 9, another layer 350 may be provided in a lower layer of the plating layer 200 (between the box contact surface 500 and the plating layer 200). In this case, for example, a zinc phosphate coating may be included, as the chemical conversion treatment layer, in the lower layer of the plating layer 200. Referring to FIG. 10, another layer 350 may be included in an upper layer of the plating layer 200, which is also a lower layer of the second resin coating 320 (between the plating layer 200 and the second resin coating 320). In this case, for example, a zinc phosphate coating may be included, or a chromate coating may be included, as the chemical conversion treatment layer, in the upper layer of the plating layer 200. Referring to FIG. 11, another layer 350 may be included in an upper layer of the zirconium oxide coating 100, which is also a lower layer of the first resin coating 310 (between the zirconium oxide coating 100 and the first resin coating 310).

[Chemical Composition of Pipe Main Body]

The chemical composition of the pipe main body 10 of the oil-well metal pipe 1 according to the present embodiment is not particularly limited. That is, in the present embodiment, the type of steel of the pipe main body 10 of the oil-well metal pipe 1 is not particularly limited. The pipe main body 10 may be formed of, for example, carbon steel, stainless steel, an alloy, or the like. That is, the oil-well metal pipe 1 may be a pipe made of a Fe-based alloy or an alloy pipe represented by a Ni-based alloy pipe. Here, the pipe is, for example, a low-alloy pipe, a martensitic stainless steel pipe, and a duplex stainless steel pipe, etc. Meanwhile, among alloy steels, Ni-based alloys and high alloy steels such as duplex stainless steels that contain alloying elements such as Cr, Ni and Mo have high corrosion resistance. Therefore using these high alloy steels as the pipe main body 10 will enable to obtain excellent corrosion resistance in a corrosive environment that contains hydrogen sulfide or carbon dioxide or the like.

[Production Method]

Hereinafter, a method for producing the oil-well metal pipe 1 according to the present embodiment will be described.

The method for producing the oil-well metal pipe 1 according to the present embodiment includes a preparation process, a zirconium chemical conversion treatment process, a plating process, and a resin coating formation process.

[Preparation Process]

In the preparation process, the oil-well metal pipe 1 including a pipe main body 10 that includes a pin 40 including a pin contact surface 400 with an external thread part 41, and a box 50 including a box contact surface 500 with an internal thread part 51 is prepared. As described above, the oil-well metal pipe 1 according to the present embodiment has a well-known structure. That is, in the preparation process, it suffices to prepare an oil-well metal pipe 1 that has a well-known structure.

[Zirconium Chemical Conversion Treatment Process]

In the zirconium chemical conversion treatment process, a zirconium chemical conversion treatment is performed on the prepared oil-well metal pipe 1 to form a zirconium oxide coating 100. The zirconium chemical conversion treatment can be performed by a well-known method. The method of the zirconium chemical conversion treatment may be performed by, for example, immersing a pin contact surface 400 or a box contact surface 500 in a treatment solution, or sprinkling the treatment solution to the pin contact surface 400 or the box contact surface 500. Further, as the zirconium chemical conversion treatment solution, a commercially available one can be used. Further, the treatment conditions in the zirconium chemical conversion treatment process can be appropriately set. For example, the zirconium chemical conversion treatment can be carried out with the concentration of the treatment solution being 3 to 10 g/L, the temperature of the treatment solution being 20 to 45° C., and the treatment time being 30 to 240 seconds.

[Plating Process]

In the plating process, of the pin contact surface 400 and the box contact surface 500 of the prepared oil-well metal pipe 1, the one on which the zirconium oxide coating 100 is not formed is subjected to a plating treatment to form a plating layer 200. The plating treatment can be carried out by a well-known method. The plating treatment is, for example, electroplating.

When forming a Zn—Ni alloy plating layer as a plating layer, the plating bath contains zinc ions and nickel ions. The composition of the plating bath is, for example, Zn: 1 to 100 g/L and Ni: 1 to 50 g/L. The conditions for electroplating can be set as appropriate. For example, the plating treatment can be carried out with the pH of the plating bath being 1 to 10, the temperature of the plating bath being 30 to 80° C., the current density being 1 to 100 A/dm$^2$, and the treatment time being 0.1 to 30 minutes.

[Resin Coating Formation Process]

In the resin coating formation process, the first resin coating 310 and the second resin coating 320 are formed for the contact surface (400 or 500) on which the zirconium oxide coating 100 is formed, and the contact surface (400 or 500) on which the plating layer 200 is formed. The method for forming the first resin coating 310 and the second resin coating 320 is not particularly limited. That is, the first resin coating 310 and the second resin coating 320 can be formed by a well-known method. For example, the resin coating may be formed by applying a composition of the first resin coating 310 to the contact surface (400 or 500) on which the zirconium oxide coating 100 is formed, and thereafter drying it. Similarly, for example, the resin coating may be formed by applying a composition of the second resin coating 320 to the contact surface (400 or 500) on which the plating layer 200 is formed, and thereafter drying it. In this case, the method of applying the composition is not particularly limited. For example, it may be spray application, brushing, or immersion. The method of drying is also not particularly limited. For example, drying may be performed by heating it at 60° C. for 20 minutes, or drying may be performed by leaving it in the air.

[Other Processes]

The oil-well metal pipe 1 according to the present embodiment may include other processes in the production process. For example, a preconditioning treatment typified by sandblasting treatment may be performed. Further, for example, chemical conversion treatments other than the zirconium chemical conversion treatment may be performed. For example, chromate treatment may be further performed. In this way, well-known production processes may be further carried out.

By the processes described so far, the oil-well metal pipe 1 according to the present embodiment is produced. However, the above-described production method is one example of the production method of the oil-well metal pipe 1 according to the present embodiment, and this production method is not limiting. The oil-well metal pipe 1 according to the present embodiment may be produced by any other method.

Example 1

Hereinafter, advantageous effects of the oil-well metal pipe of the present embodiment will be described more specifically by way of examples. The condition in the following examples is one exemplary condition adopted for confirming the feasibility and advantageous effects of the oil-well metal pipe of the present embodiment. Therefore, the oil-well metal pipe of the present embodiment is not limited to this one exemplary condition.

In Example 1, as the oil-well metal pipe, VAM21 (registered trademark) manufactured by Nippon Steel Corporation was used. VAM21 (registered trademark) is an oil-well metal pipe having an external diameter of 244.48 mm (9⅝ inches) and a wall thickness of 13.84 mm. The steel grade corresponded to P110 according to API 5CT standard.

[Test Number 1]

In Test Number 1, a zirconium chemical conversion treatment was performed on the pin contact surface to form a zirconium oxide coating. In the zirconium chemical conversion treatment, as the treatment solution, PALLUCID 1500 (trade name) manufactured by Nihon Parkerizing Co., Ltd. was used. The concentration of the treatment solution was 50 g/L, the treatment temperature was 45° C., and the treatment time was 60 seconds.

A first resin coating was further formed on the pin contact surface of Test Number 1 on which the zirconium oxide coating was formed. Specifically, a composition containing an epoxy resin was applied. The method of application was spray coating. After the application, the first resin coating was heated at 50° C. for 5 minutes to be dried.

Electroplating treatment was performed on the box contact surface to form a Zn—Ni alloy plating layer. As the Zn—Ni alloy plating bath, DAIN Zinalloy N-PL (trade name) manufactured by Daiwa Fine Chemicals Co., Ltd. was used. The conditions for electroplating were as follows: the pH of the plating bath was 6.5, the temperature of the plating bath was 25° C., the current density was 2 A/dm$^2$, and the treatment time was 18 minutes. The plating bath contained 85% of Zn and 15% of Ni.

Further, a second resin coating was formed on the box contact surface of Test Number 1 on which the Zn—Ni alloy plating layer was formed. Specifically, a composition containing an epoxy resin was applied. The method of application was spray coating. After the application, the second resin coating was heated at 230° C. for 10 minutes to be dried.

[Test Number 2]

In Test Number 2, a zinc phosphate coating was formed by performing a zinc phosphate chemical conversion treatment on the pin contact surface. In the zinc phosphate chemical conversion treatment, as the treatment solution, PB-181X (trade name) manufactured by Nihon Parkerizing Co., Ltd. was used. The total acidity of the treatment solution was 45 pt, the treatment temperature was 80° C., and the treatment time was 400 seconds. Other configurations of Test Number 2 were the same as those of Test Number 1. That is, in the pin contact surface of Test Number 2, a first resin coating including a similar epoxy resin to that of Test Number 1 was formed on the zinc phosphate coating.

[Galling Resistance Evaluation Test]

A repeated fastening test was conducted on Test Numbers 1 and 2 to evaluate galling resistance. Using the pin and box of Test Numbers 1 and 2, fastening and loosening were repeated at a room temperature (20° C.). Specifically, fastening was repeated at a fastening speed of 10 rpm and with a fastening torque of 42.8 kN·m. Torque was measured at the time of fastening. Shouldering torque at each fastening count in Test Numbers 1 and 2 is shown in Table 1.

TABLE 1

| Fastening count | Shouldering torque (ft · lbs) | |
|---|---|---|
| (times) | Test Number 1 | Test Number 2 |
| 1 | 16510 | 15985 |
| 2 | 24264 | 18958 |
| 3 | 24348 | 20982 |
| 4 | 21975 | 24073 |
| 5 | 23234 | 24308 |
| 6 | 25348 | 27658 |
| 7 | 25762 | 28095 |

[Evaluation Results]

Referring to Table 1, in Test Number 1, a zirconium oxide coating was formed on the pin contact surface. As a result, compared with an oil-well metal pipe in which a zinc phosphate coating was formed on the pin contact surface, the shouldering torque was kept lower as the fastening count increases. That is, the oil-well metal pipe of Test Number 1 exhibited excellent galling resistance.

Example 2

In Example 2, a chemical conversion treatment layer and a resin coating, and a plating layer and a resin coating were formed on a plate test specimen to evaluate peel strength of the resin coating. Specifically, as a test specimen, a cold rolled steel plate with a thickness of 0.8 mm and a size of 70 mm×150 mm was used. The steel grade of the cold rolled steel plate used as the test specimen corresponded to SPCC specified in JIS G 3141 (2017).

[Test Number 3]

In the test specimen of Test Number 3, like in the case of the pin contact surface of Test Number 1 of Example 1, zirconium chemical conversion treatment was performed to form a zirconium oxide coating. Further, like in the case of the pin contact surface of Test Number 1 of Example 1, a first resin coating was formed. The method of zirconium chemical conversion treatment, and the method for forming the first resin coating were the same as those in Test Number 1 of Example 1.

[Test Number 4]

In the test specimen of Test Number 4, like in the case of the pin contact surface of Test Number 2 of Example 1, zinc phosphate chemical conversion treatment is performed to form a zinc phosphate coating. Further, like in the case of the pin contact surface of Test Number 2 of Example 1, a first resin coating was formed. The method of zinc phosphate chemical conversion treatment, and the method for forming the first resin coating were the same as those in Test Number 2 of Example 1.

[Test Number 5]

In a test specimen of Test Number 5, like in the case of the box contact surface of Test Number 1 of Example 1, an electroplating treatment was performed to form a Zn—Ni alloy plating layer. Further, like in the case of the box contact surface of Test Number 1 of Example 1, a second resin coating was formed. The method of electroplating treatment, and the method for forming the second resin coating were the same as those in Test Number 1 of Example 1.

[Pencil Hardness Test]

For test specimens of Test Numbers 3 to 5, a scratch hardness test (pencil method) specified in JIS K 5600 May 4 (1999) was performed to evaluate peel strength of the resin coating of each Test Number. Specifically, for the test specimens of Test Numbers 3 to 5, after the front edge of a pencil was placed on the resin coating, the pencil was pushed so as to be immediately moved away at a speed of 0.5 to 1.0 mm/sec by a distance of 7 mm or more. The presence or absence of a scratch was confirmed by the naked eye. When no scratch was confirmed, the hardness of the pencil lead was raised by one step, and the test was continued. In this way, the hardness of pencil lead at which no scratch was confirmed by scratching with the pencil, the hardness of pencil lead at which a scratch was first confirmed, and the hardness of pencil lead at which the resin coating peeled were obtained. Table 2 shows the results of the pencil hardness test according to each test number.

TABLE 2

| Test Number | Lower layer | Upper layer | Without scratch | With scratch | Peeling |
|---|---|---|---|---|---|
| 3 | Zirconium oxide coating | Epoxy resin | H | 2H | 3H |
| 4 | Zinc phosphate coating | Epoxy resin | 2H | 3H | 7H |
| 5 | Zn—Ni alloy plating layer | Epoxy resin | 2H | 3H | 4H |

Evaluation Results

Referring to Table 2, it was confirmed that the resin coating formed on the zirconium oxide coating shown in Test Number 3 was more likely to peel compared with those shown in Test Numbers 4 and 5. On the other hand, it was confirmed that the resin coating formed on the zinc phosphate coating shown in Test Number 4 exhibited the same level of peelability as that of the resin coating formed on the Zn—Ni alloy plating layer shown in Test Number 5.

So far, the embodiments of the present disclosure have been described. However, the embodiments described above are merely examples for carrying out the present disclosure. Therefore, the present disclosure is not limited to the embodiments described above, and the embodiments described above can be appropriately modified and practiced within a range not departing from the spirit of the present disclosure.

REFERENCE SIGNS LIST

1 Oil-well metal pipe
10 Pipe main body
10A First end portion
10B Second end portion
11 Pin tube body
12 Coupling
40 Pin
41 External thread part
42 Pin sealing surface
43 Pin shoulder surface
50 Box
51 Internal thread part
52 Box sealing surface
53 Box shoulder surface
100 Zirconium oxide coating
200 Plating layer
310 First resin coating
320 Second resin coating
400 Pin contact surface
500 Box contact surface

The invention claimed is:

1. An oil-well metal pipe comprising:
a pipe main body including a first end portion and a second end portion, the pipe main body including:
a pin formed at the first end portion; and
a box formed at the second end portion,
wherein:
the pin includes a pin contact surface including an external thread part; and
the box includes a box contact surface including an internal thread part;
the oil-well metal pipe further comprising:
a zirconium oxide coating formed on one of the pin contact surface and the box contact surface,
a first resin coating formed on or above the zirconium oxide coating,
a plating layer formed on or above the other of the pin contact surface and the box contact surface, and
a second resin coating formed on or above the plating layer.

2. The oil-well metal pipe according to claim 1, wherein the zirconium oxide coating is formed on the pin contact surface, and
the plating layer is formed on or above the box contact surface.

3. The oil-well metal pipe according to claim 1, wherein the plating layer is a Zn—Ni alloy plating layer.

4. The oil-well metal pipe according to claim 2, wherein the plating layer is a Zn—Ni alloy plating layer.

* * * * *